United States Patent
Hadj-Sassi et al.

(10) Patent No.: US 10,330,819 B2
(45) Date of Patent: Jun. 25, 2019

(54) DOWNHOLE WETTABILITY ESTIMATE USING MULTI-FREQUENCY DIELECTRIC MEASUREMENTS

(71) Applicant: Schlumberger Technology Corporation, Sugar Land, TX (US)

(72) Inventors: Khaled Hadj-Sassi, Al-khobar (SA); Mohammed Badri, Al-khobar (SA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1212 days.

(21) Appl. No.: 14/528,521

(22) Filed: Oct. 30, 2014

(65) Prior Publication Data

US 2015/0127264 A1    May 7, 2015

Related U.S. Application Data

(60) Provisional application No. 61/898,976, filed on Nov. 1, 2013.

(51) Int. Cl.
*G01V 3/38* (2006.01)
*G01V 3/30* (2006.01)
(Continued)

(52) U.S. Cl.
CPC ............. *G01V 3/38* (2013.01); *G01V 3/30* (2013.01); *E21B 2049/085* (2013.01); *G01V 99/00* (2013.01)

(58) Field of Classification Search
CPC . G01V 3/38; G01V 3/30; G01V 99/00; E21B 2049/085
See application file for complete search history.

(56) References Cited

U.S. PATENT DOCUMENTS

2015/0361789 A1* 12/2015 Donderici ............... G01V 3/20
    367/82
2016/0061987 A1*  3/2016 Kherroubi ............... G01V 3/18
    702/7

OTHER PUBLICATIONS

Feng, et al., "Geometrical model of conductive and dielectric properties of partially saturated rocks", Journal of Applied Physics, vol. 58, 1985, pp. 3236-3243.
(Continued)

*Primary Examiner* — Regis J Betsch
*Assistant Examiner* — Jeremy A Delozier

(57) ABSTRACT

The wettability of a formation may be estimated using a multi-frequency dielectric measurement tool. Multi-frequency dielectric dispersion measurements are made using the multi-frequency dielectric measurement tool on a sample. The bulk density and the total porosity of the sample are also otherwise acquired. The bulk density, matrix permittivity, total porosity, and multi-frequency dielectric dispersion measurements are input into a petrophysical dielectric model and the petrophysical dielectric model is applied to obtain inversion results. A wettability state of the sample is determined using the inversion results and one or more reservoir management decisions are made based on the determined wettability state of the sample. A non-transitory, computer-readable storage medium may be provided that has stored on it one or more programs that provide instructions. The instructions are executed by a processor and cause the processor to develop an estimation of formation wettability that may be used for reservoir management.

20 Claims, 5 Drawing Sheets

(51) Int. Cl.
*G01V 99/00* (2009.01)
*G01V 3/14* (2006.01)
*E21B 49/08* (2006.01)

(56) References Cited

OTHER PUBLICATIONS

Haslund, et al., "Determination of porosity and formation factor of water-saturated porous specimens from dielectric dispersion measurements", Geophysics, vol. 63 No. 1, Jan. 1998, pp. 149-153.
Hizem, et al., "Dielectric Dispersion: A New Wireline Petrophysical Measurement", SPE-116130-MS, Society of Petroleum Engineers, SPE Annual Technical Conference and Exhibition, Denver, Colorado, USA, Sep. 21-24, 2008, 21 pages.
Jones, et al., "Surface area, geometrical and configurational effects on permittivity of porous media", Journal of Non-crystalline Solids, vol. 305, No. 1, Jan. 2002, pp. 247-254.
Jones, et al., "Thermal and Geometrical Effects on Bulk Permittivity of Porous Mixtures Containing Bound Water", Electromagnetic Aquametry, 2005, pp. 71-92.
Mendelson, et al., "The effect of grain anisotropy on the electrical properties of sedimentary rocks", Geophysics, vol. 47, No. 2, 1982, pp. 257-263.

Or, et al., "Temperature effects on soil bulk dielectric permittivity measured by time domain reflectometry: A physical model", Water Resources Research, vol. 35, Issue 2, Feb. 1999, pp. 371-383.
Seleznev, et al., "Formation properties derived from a multi-frequency dielectric measurement", SPWLA-2006-VVV, Society of Petrophysicists and Well-Log Analysts, SPWLA 47th Annual Logging Symposium, Veracruz, Mexico, Jun. 4-7, 2006, 12 pages.
Sen, et al., "Grain shape effects on dielectric and electrical properties of rocks", Geophysics, vol. 49, No. 5, 1984, pp. 586-587.
Sen, et al., "Relation of certain geometrical features to the dielectric anomaly of rocks", Geophysics, vol. 46, No. 12, 1981, pp. 1714-1720.
Stroud, et al., "Analytical model for the dielectric response of brine-saturated rocks", Physical Review B, vol. 34, Oct. 15, 1986, 9 pages.
Stukan, et al., "Bulk properties of SWM4-NDP water model at elevated temperature and pressure", Journal of Molecular Liquids, vol. 180, Apr. 2013, pp. 65-69.
Bona et al., "Electrical Measurements in the 100 Hz to 10 GHz Frequency Range for Efficient Rock Wettability Determination", SPE Journal, Mar. 2001, pp. 80-88.
Chen et al., "Effects of Maxwell-Wagner polarization on soil complex dielectric permittivity under variable temperature and electrical conductivity", Water Resources Research, vol. 42, Jun. 2006, pp. 14.

\* cited by examiner

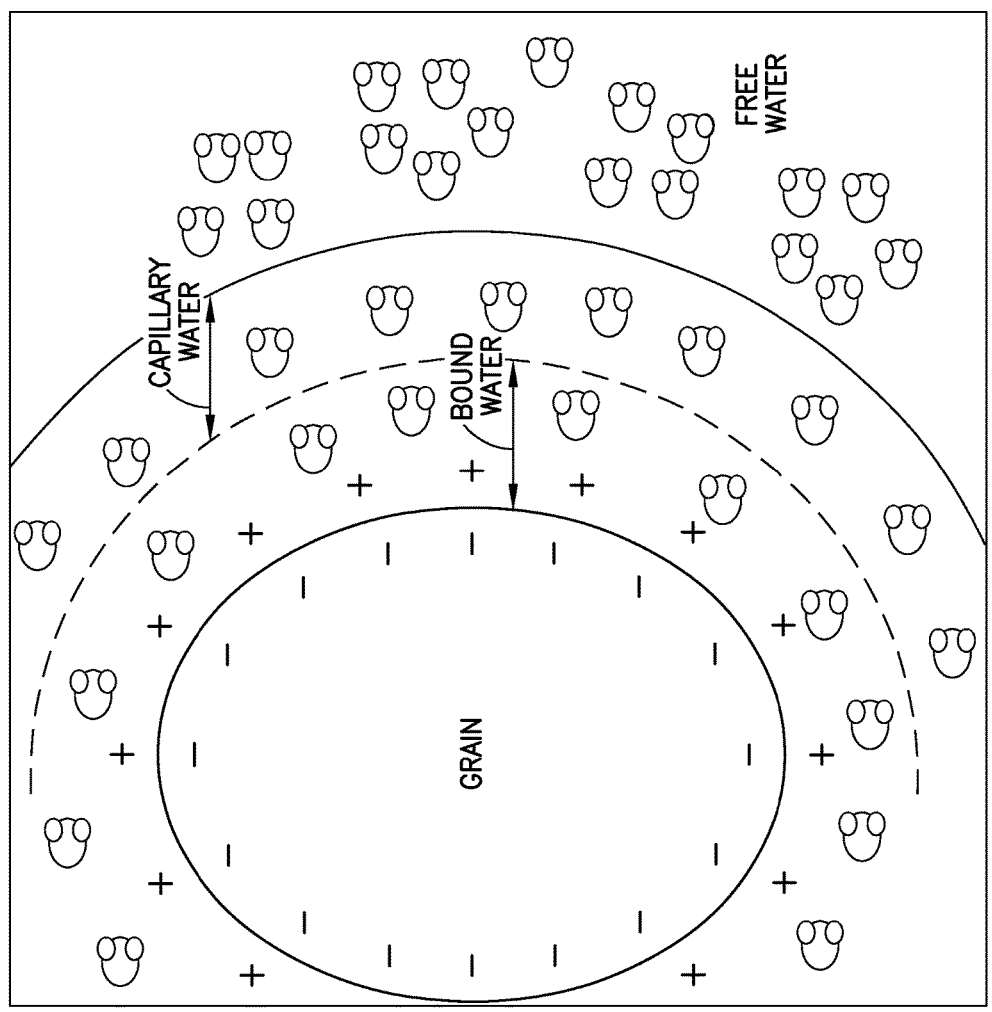

DOWNHOLE WETTABILITY ESTIMATE USING MULTI-FREQUENCY DIELECTRIC MEASUREMENTS

CROSS-REFERENCE TO RELATED APPLICATIONS

This application claims, under 35 U.S.C. § 119, priority to and the benefit of U.S. Provisional Patent Application No. 61/898,976, filed Nov. 1, 2013.

BACKGROUND OF THE DISCLOSURE

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used.

Early logging tools were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. MWD tools typically provide drilling parameter information such as weight on the bit, torque, temperature, pressure, direction, and inclination. LWD tools typically provide formation evaluation measurements such as resistivity, porosity, and NMR distributions. MWD and LWD tools often have components common to wireline tools (e.g., transmitting and receiving antennas), but MWD and LWD tools must be constructed to not only endure but to operate in the harsh environment of drilling.

Electromagnetic tools generally use either magnetic dipole antennas, in which case they are based on induction physics, or they use electrodes (electric dipole antennas) to inject current into the formation. Typically, particularly for electromagnetic measurements, a signal originates from a tool disposed in the interior of an uncased wellbore, passes through the formation outside the wellbore, and returns to a receiver within the wellbore. Because the signal travels through the formation, certain properties of the formation can be inferred from the measurement. Measurements are typically performed in an uncased portion of the wellbore because conventional conductive casing tends to limit the electromagnetic signal that can pass between the interior and exterior of a cased wellbore.

Dielectric measurements are electromagnetic measurements used to estimate petrophysical properties such as (but not limited to) water saturation, water salinity, and hydrocarbon residual saturation, as well as textural information regarding the geometry of a porous medium. Dielectric measurement tools generally use higher frequency signals than conventional electrical resistivity tools. Several petrophysical models have been developed to interpret and link the dielectric measurements to the petrophysical properties mentioned above.

Numerous dielectric forward models exist to convert the dielectric measurements into water saturation and the other reservoir properties listed above. Such models, referred to herein as "background models", include, but are not limited to, the Bimodal Model, the Stroud-Milton-De Model, the Shaly Sand Model, and the Complex Refractive Index Model (CRIM). Each type of model has inherent strengths and weaknesses based on the assumptions intrinsic to the model. Some model types (e.g., effective medium and phenomenological) work well with relatively different rock types, taking into account the order and shape of replacement material. These models are derived to capture different polarization effects regardless of the geometrical features of the system. Other model types (e.g., empirical and semi-empirical) can accurately predict values for the data used to construct them, but are not widely applicable to capture all the polarization effects of the dielectric dispersion. None of those models, however, adequately provides wettability information. Furthermore, conventional wettability measurements within laboratories do not fully or adequately represent the actual downhole wettability, which is often difficult to measure.

SUMMARY

The wettability of a formation may be estimated using a multi-frequency dielectric measurement tool. Multi-frequency dielectric dispersion measurements are made using the multi-frequency dielectric measurement tool on a sample. The bulk density and the total porosity of the sample are also otherwise acquired. The bulk density, matrix permittivity, total porosity, and multi-frequency dielectric dispersion measurements are input into a petrophysical dielectric model and the petrophysical dielectric model is applied to obtain inversion results. A wettability state of the sample is determined using the inversion results and one or more reservoir management decisions are made based on the determined wettability state of the sample. A non-transitory, computer-readable storage medium may be provided that has stored on it one or more programs that provide instructions. The instructions are executed by a processor and cause the processor to develop an estimation of formation wettability that may be used for reservoir management.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Embodiments are described with reference to the following figures. The same numbers are generally used throughout the figures to reference like features and components.

FIG. 2 is a schematic drawing of a model of vicinal water dielectric permittivity, in accordance with the present disclosure.

FIGS. 3A and 4A are plots comparing water-filled porosity (square markers) with bound water volume fraction (circular markers) (both plotted versus aging), and FIGS. 3B and 4B are plots of the water-wet specific surface area for each core (both plotted versus aging), which serves as an indication of wettability alteration, in accordance with the present disclosure.

DETAILED DESCRIPTION

Figure 1:
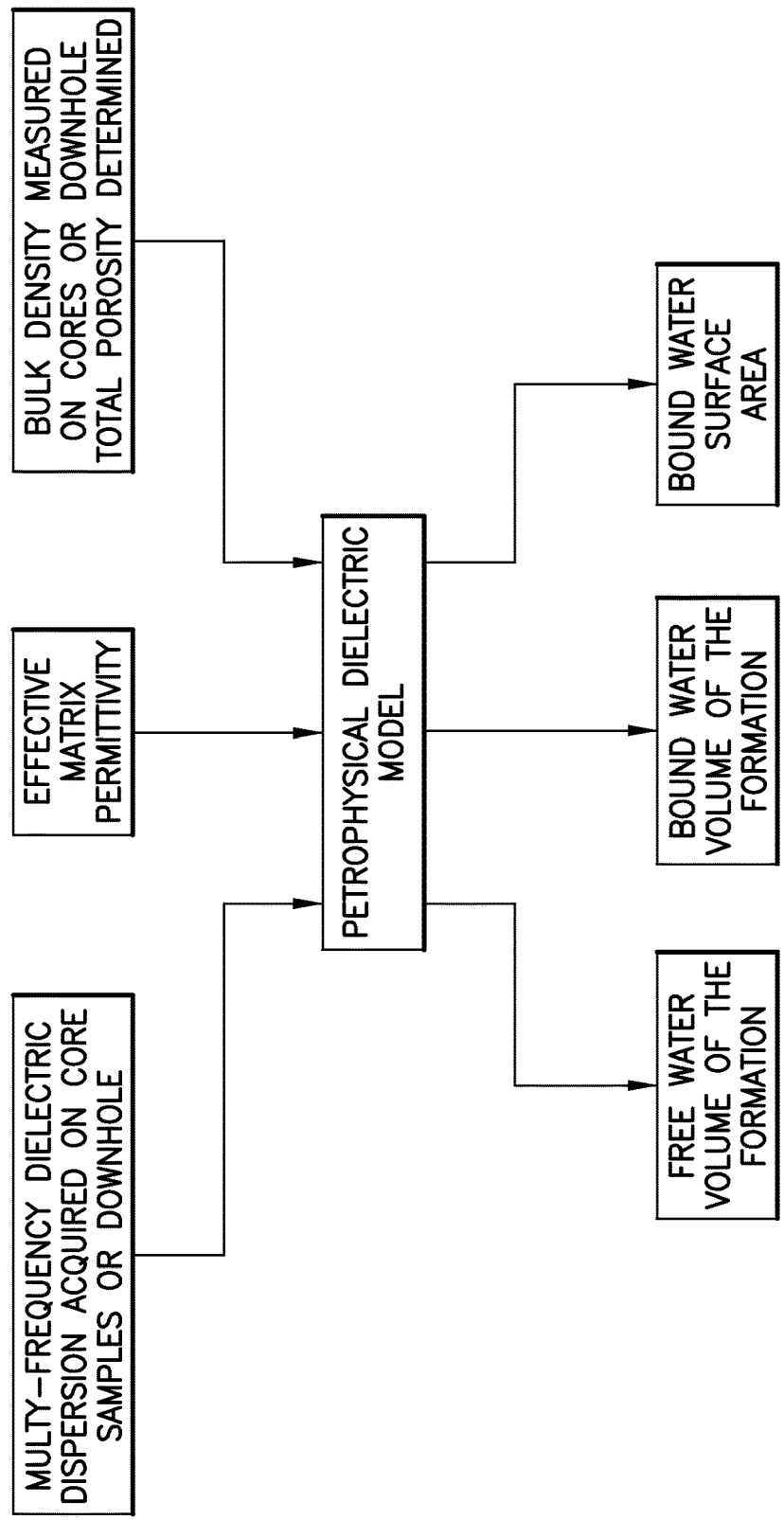
FIG. 1 illustrates an embodiment in which estimates of the free water, bound water, and bound water surface area are made and used as indications of wettability, in accordance with the present disclosure.
Figure 3A:
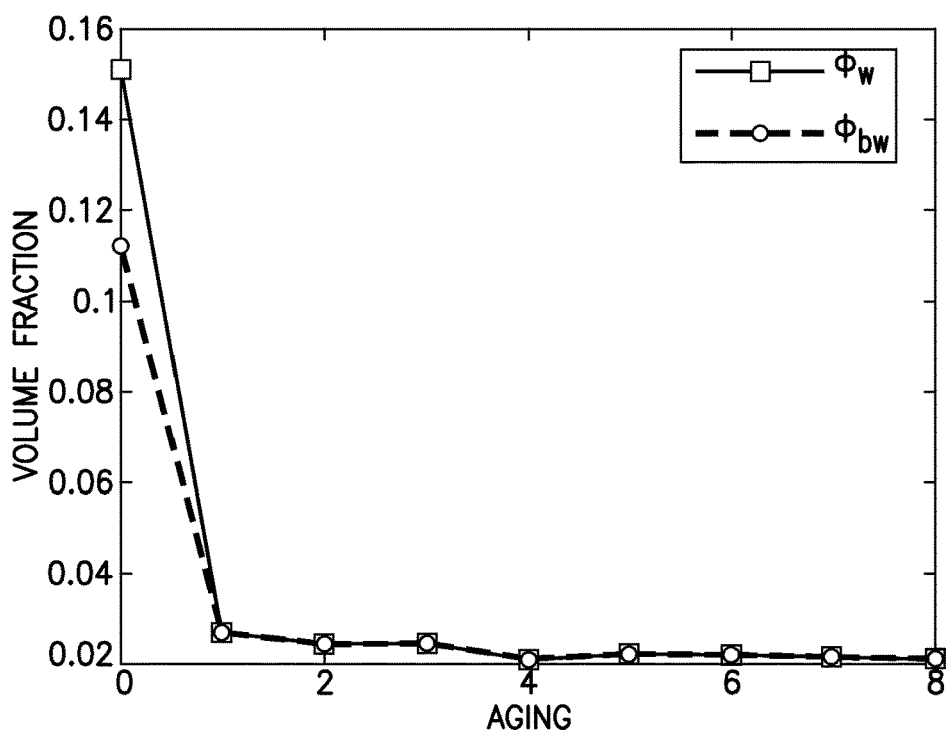
FIGS. 3A, 3B, and 4A, 4B illustrate outputs in accordance with the present disclosure at different stages of aging for two different cores, respectively.
Figure 3B:
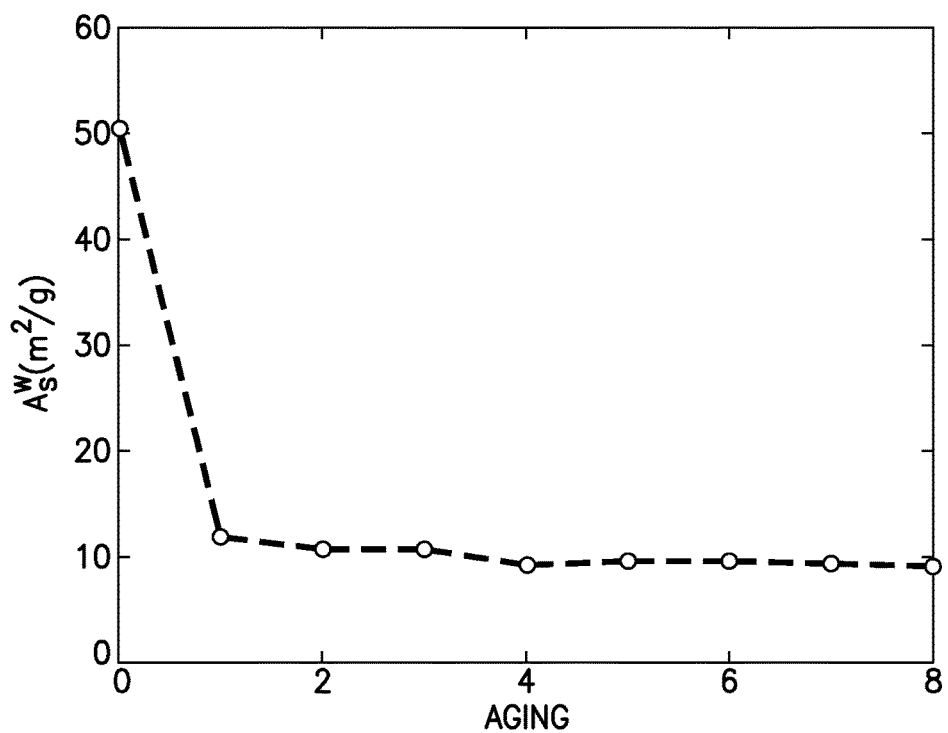
Figure 4A:
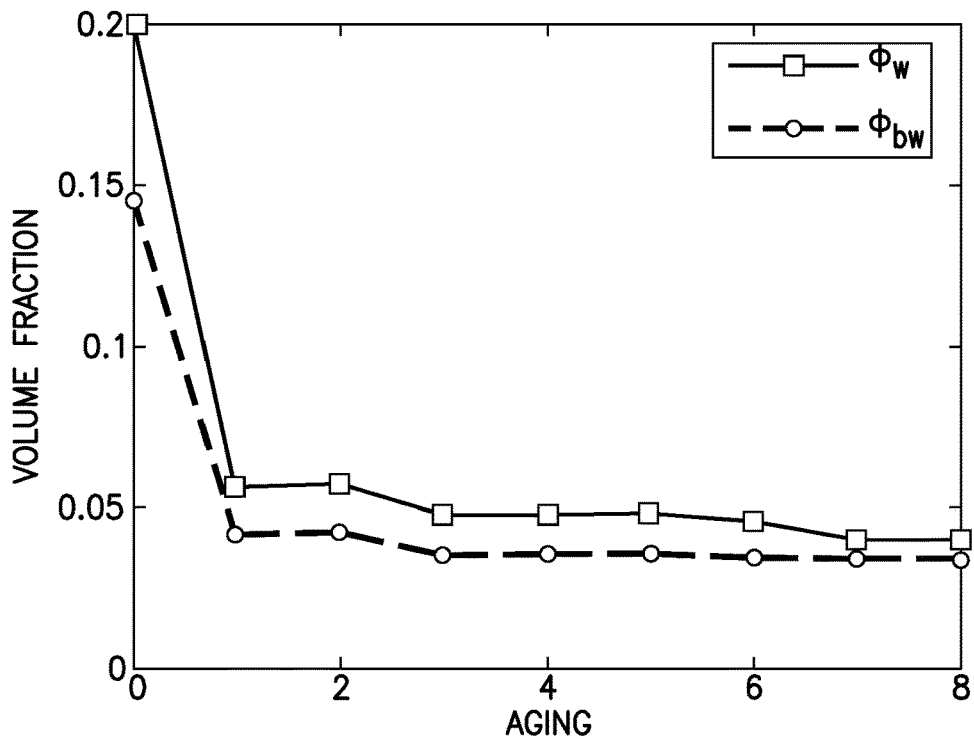
Figure 4B:
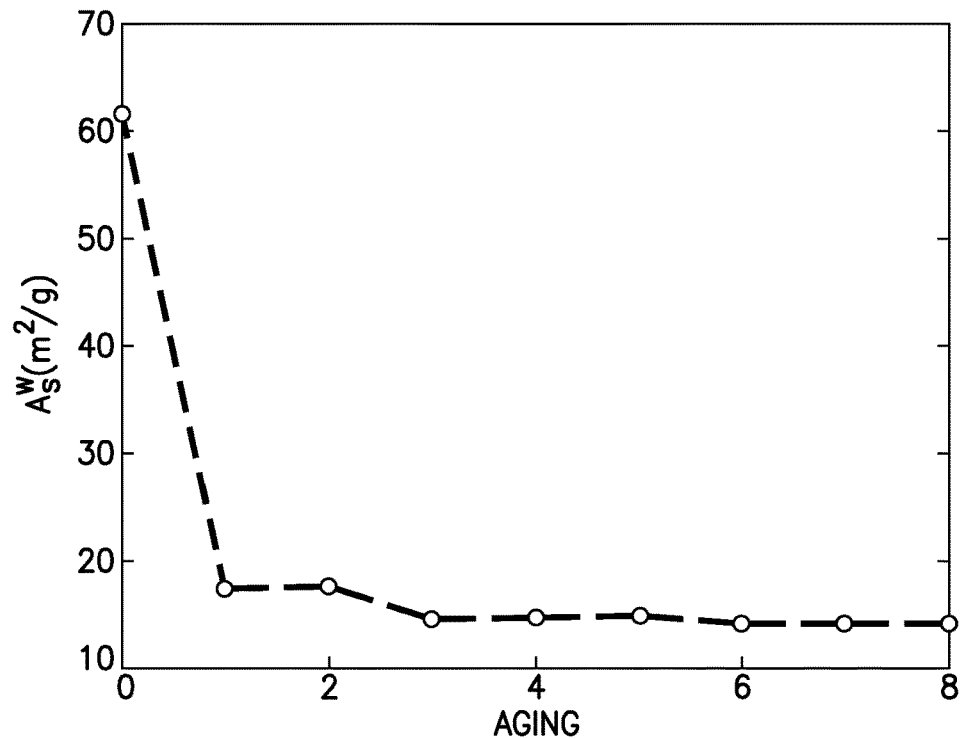

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship, as appropriate. It will also be understood that, although the terms first, second, etc. may be used herein to describe various elements, these elements should not be limited by these terms. These terms are only used to distinguish one element from another.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A system and method to estimate the wettability of a formation using a dielectric measurement tool is disclosed. At least certain dielectric logging tools can measure the formation dielectric constant (permittivity) and conductivity at multiple frequencies, typically ranging from 20 MHz to 1 GHz. One exemplar device features a short, articulated pad, allowing optimal pad contact even in rough boreholes and minimizing environmental effects. Two transmitters and eight receivers are mounted on the pad, along with a pair of electric dipoles operating in "reflection mode" that measure the mudcake or other material directly in front of the pad face. The analysis of the multi-frequency dielectric measurements provides information about such properties as the formation water volume, water salinity, and rock texture, as well as others.

Existing techniques to determine standard wettability are time-consuming and carry the risk that the collected cores poorly represent the original formation. However, an in-situ quantitative estimate of reservoir wettability may be made based on dielectric dispersion. In one or more embodiments, a forward model is used to model the effect of the rock wettability on the dielectric multi-frequency measurements. Wettability is a useful parameter for estimating reservoir oil saturation and production amounts.

In one embodiment, an accounting is made for two distinguishable categories of formation water. Bound water (water bound to the grain surface) is differentiated from free water (water that can flow freely through the pores) in a porous medium. A water dielectric model may be coupled with the Bimodal Model, for example, or with other background models. Information may be obtained regarding the amount of bound water and the specific surface area covered by bound water. Those two properties, which are strongly linked to wettability, may be obtained using bulk density as an additional input parameter when compared to the conventional background models. Both laboratory measurements and field data collected by a wireline tool have been used to validate the obtained results. FIG. 1 illustrates an embodiment in which estimates of the free water, bound water, and bound water surface area are made and used as indications of wettability In the following description, a background model is modified to include an equation of water dielectric permittivity. The additional equation was determined by considering two categories of formation water instead of one: free water and bound water. For ease of discussion herein and as a specific example, a Bimodal Model is modified, but other background models can be similarly modified. The background model is used to account for geometrical effects based on grain sizes, shapes, and distribution. The Bimodal Model discussed herein is derived from the dielectric dispersion theory of granular materials, often referred to as the Mendelson, Cohen, and Sen (MCS) theory. Origins of MCS theory go back to Bruggeman's differential (or asymmetrical) effective medium approximation wherein a moderate amount of grain can be added to a homogenous host material. That approximation was later extended to work for high volume fractions of spherical grains, and then further generalized to include ellipsoidal grains having different aspect ratios. MCS theory was finally realized when certain corrections were made (by Sen) to the work of Mendelson and Cohen and, in addition, random grain orientations were taken into account. The equation for the MCS differential equation is given by:

$$-\frac{d\phi}{3\phi} = \frac{d\varepsilon}{\varepsilon(\varepsilon_m - \varepsilon)} \frac{(\varepsilon_m + 2\varepsilon)[(1-\delta)\varepsilon_m + \delta\varepsilon][(2-\delta)\varepsilon + \delta\varepsilon_m]}{9(1-p)[(1-\delta)\varepsilon_m + \delta\varepsilon][(2-\delta)\varepsilon + \delta\varepsilon_m] + p(\varepsilon_m + 2\varepsilon)[(4-3\delta)\varepsilon_m + (2+3\delta)\varepsilon]} \quad (1)$$

where $\varepsilon$ is the complex effective dielectric constant, $\varepsilon_m$ is the matrix dielectric constant, p stands for the probability of plate-like grains with depolarization factor (L=1−δ), and δ represents the plate thickness. L is a function of the aspect ratio a/b of oblate ellipsoids with three semi-axes (a<b=c), and (1−p) is the probability of spherical grains with L=⅓.

Equation (2) represents the solution of Equation (1):

$$\phi_w = \left(\frac{\varepsilon_w}{\varepsilon}\right)^{p_1} \left(\frac{\varepsilon - \varepsilon_m}{\varepsilon_w - \varepsilon_m}\right)^{p_2} \left(\frac{\varepsilon_w - A\varepsilon_m}{\varepsilon - A\varepsilon_m}\right)^{p_3} \left(\frac{\varepsilon_w - B\varepsilon_m}{\varepsilon - B\varepsilon_m}\right)^{p_4} \quad (2)$$

In this solution, the complex effective dielectric constant ($\varepsilon$) is given as an implicit function of the matrix dielectric constant ($\varepsilon_m$) and the water complex dielectric function ($\varepsilon_w$). Parameters $p_1$, $p_2$, $p_3$, $p_4$, A, and B are all functions of p and δ.

Water molecules are dipolar, exhibiting a permanent electric dipole. They change their orientation to align with an external electric field, whenever applied. Several variables can affect the permittivity of water as a function of frequency ($f$). Among these variables are temperature (T), salinity (S), and pressure (P). Each of those variables can affect the orientation or concentration of water molecules, which can affect permittivity. For instance, increasing temperature disturbs the overall alignment of water molecules with the applied field, thus decreasing the water permittivity. In contrast, pressure increases the concentration of water molecules per unit volume of space, leading to an increase in water permittivity. As for salinity, salt ion hydration reduces water permittivity as a result of reducing the concentration of water molecules per unit volume due to the ions introduced, and hindering a water molecule's ability to rotate due to its being bound to hydrated ions. Therefore, free water complex permittivity ($\varepsilon_{fw}$), which is independent of contact with a grain surface, may be expressed as a function of $f$, T, S, and P.

To capture more of the physics of the modeled system, water permittivity was considered subject to the effect of boundedness to the grain surface. Properties of water molecules in contact with solid surfaces are different than bulk (free) water, as those (bound) molecules are subjected to short and long range forces. This effect may be expressed by:

$$\varepsilon_w = \varepsilon_{fw}(f, T, S, P)\left[1 - \exp\left(-\frac{t_w}{x(T)}\right)\right]\alpha + \varepsilon_{fw}(f, T, S, P)(1-\alpha) \quad (3)$$

In Equation (3), $t_w$ represents the total thickness of a water layer covering the grain surface, and x(T) refers to the layer thickness of bound water molecules hindered from rotation. α is introduced to better capture the complete picture in a real system by differentiating between the two categories of water, and is given by:

$$\alpha = \frac{\phi_{cbw}}{\phi_w} \quad (4)$$

While water molecules in the vicinity of solid surfaces are hindered from rotating when subjected to an external electric field, the boundedness effect decreases for water molecules farther away from the surfaces. FIG. 2 illustrates a model of vicinal water dielectric permittivity. The dielectric permittivity of the water layers decreases in the direction towards the solid surface. Roughly speaking, the first few layers of water molecules are partially or completely immobile as a consequence of boundedness to the grain surface. As the figure shows, the water nearest to the grain surface is bound water. Water beyond the bound water, but still relatively near the grain surface, is capillary water. Beyond the capillary water is free water. With these considerations, the complex permittivity of water can be evaluated using Equation (3) to account for both the thermodynamic conditions and the boundedness effects.

The ratio of the water volume fraction covering the grain surfaces ($\phi_{cbw}$) to the total water volume fraction ($\phi_w$) is reflected by α, given by Equation (4). Therefore, the first term in Equation (3) accounts for water covering grain surfaces (bound water), while the second term accounts for the remaining water in the rock, which is free water.

The water volume fraction of water wetting the grain surfaces, $\phi_{cbw}$, can be expressed in terms of the water-wet specific surface area ($A^w_s$), the bulk density ($\rho_b$), and the water layer thickness ($t_w$). (See Equation (5).) Similarly, $\phi_{bw}$, standing for bound water volume fraction of water affected by boundedness, can be expressed in terms of $A^w_s$ and $\rho_b$, but $t_w$ is replaced by x(T). (See Equation (6).)

$$\phi_{cbw} = \rho_b A^w_s t_w \quad (5)$$

$$\phi_{bw} = \rho_b A^w_s x(T) \quad (6)$$

By substituting $t_w$ and x(T) as they appear in Equations (5) and (6), respectively, Equation (3) may be rearranged to take the form shown in Equation (7). Equation (7) is the final form of the water dielectric model used in this embodiment.

$$\varepsilon_w = \varepsilon_{fw}(f, T, S, P)\left[1 - \exp\left(-\frac{\phi_{cbw}}{\phi_{bw}}\right)\right]\alpha + \varepsilon_{fw}(f, T, S, P)(1-\alpha) \quad (7)$$

The characteristic parameter x(T) represents the thickness of the bound water layer hindered from rotation as a function of temperature, and is given by:

$$x(T) = \frac{a}{-d + T\ln\left(\frac{k_B T}{8\pi^2 r^3 c f_{rel}}\right)} \quad (8)$$

The parameters in Equation (8) include Boltzmann's constant $k_B$=1.38062×10$^{-23}$ J/K and constants a=1621 ÅK, c=9.5×10$^{-7}$ Pas, and d=2047 K, while r=2.5×10$^{-10}$ m is the radius of a water molecule and $f_{rel}$=10$^9$ Hz is relaxation frequency.

A Debye relaxation time (τ) model for pure polar substances may be used to derive an expression for x(T), with the help of the definition of $f_{rel}$ given by Equation (10). Inserting τ from Equation (9) into Equation (10), a relation between $f_{rel}$ and the water viscosity profile (η) may be obtained, as shown in Equation (11).

$$\tau = \frac{4\pi r^3 \eta}{k_B T} \qquad (9)$$

$$f_{rel} = \frac{1}{2\pi\tau} \qquad (10)$$

$$f_{rel} = \frac{k_B T}{8\pi^2 r^3 \eta} \qquad (11)$$

$$\eta = \eta_o(T)\exp\left(\frac{a}{Tx(T)}\right) \qquad (12)$$

$$\eta_o(T) = c\exp\left(\frac{d}{T}\right) \qquad (13)$$

$$J = \left\|\frac{\varepsilon' \varepsilon'_{sim}}{\varepsilon'}\right\| + \left\|\frac{\sigma - \sigma_{sim}}{\sigma}\right\| \qquad (14)$$

The viscosity of water given by Equation (12) takes into account the effects of the thickness of the bound water (x(T)) and temperature (T) on bulk water viscosity ($\eta_o$(T)). An inversion algorithm inverts for the parameters of interest as described in FIG. 1. The cost function of the inversion process is given by Equation (14). Inputs to the inversion process include measured values of $\varepsilon'$ (relative real permittivity) and $\sigma$ (conductivity) of the imaginary part of the complex permittivity, as well as T, P, $\varepsilon_m$, and $\rho_b$ (bulk density). Outputs include $\phi_w$, $\phi_{cbw}$, and $A^w_s$. The information extracted by the models disclosed herein allow one to make rock wettability estimations.

Fitting available data was done using an optimization scheme implemented in MATLAB®. The built-in function "fmincon" was used to minimize a cost function. Cost function (J) is equal to the sum of the norms of relative deviations of simulated relative real permittivity ($\varepsilon'_{sim}$) and conductivity ($\sigma_{sim}$) from the measured ones ($\varepsilon'$ and $\sigma$). (See Equation (14).) Five fitting parameters were used: p, $\delta$, $S_w$, $\alpha$ and $\phi_{bw}$. Geometrical effects were accounted for via p and $\delta$. Water content was tuned through $S_w$, while $\alpha$ presented a weighting factor to differentiate between free and bound water. Note that p, $\delta$, $S_w$, and $\alpha$ were all constrained to have values between 0 and 1. Finally, $\phi_{bw}$ reflects the bound water volume fraction (i.e., that portion actually affected by boundedness). Based on the optimized parameters, a water-wet specific surface area was evaluated using Equation (5). $t_w$ is used as a multiple of the characteristic parameter x(T). $\rho_b$, T, and P are all known.

Experimental data were collected on different sandstone and carbonate rocks samples. The core samples were initially water-wet and went through different aging stages to alter the wettability towards oil-wet. During the aging process, measurements were taken at different times along a wide range of frequencies (10 MHz≤f≤1 GHz). FIGS. 3A, 3B, 4A, and 4B summarize two possible outputs: $\phi_{bw}$ and $A^w_s$. In these figures, the "A" plots compare the water-filled porosity to the bound water volume fraction. The "B" plots show the change in specific surface area that is wetted with water. As expected, when the sample is fully saturated with water, $A^w_s$ is at its highest value. That is, as water is drained and aging proceeds, $A^w_s$ decreases due to water wettability decreasing.

Figure 5:
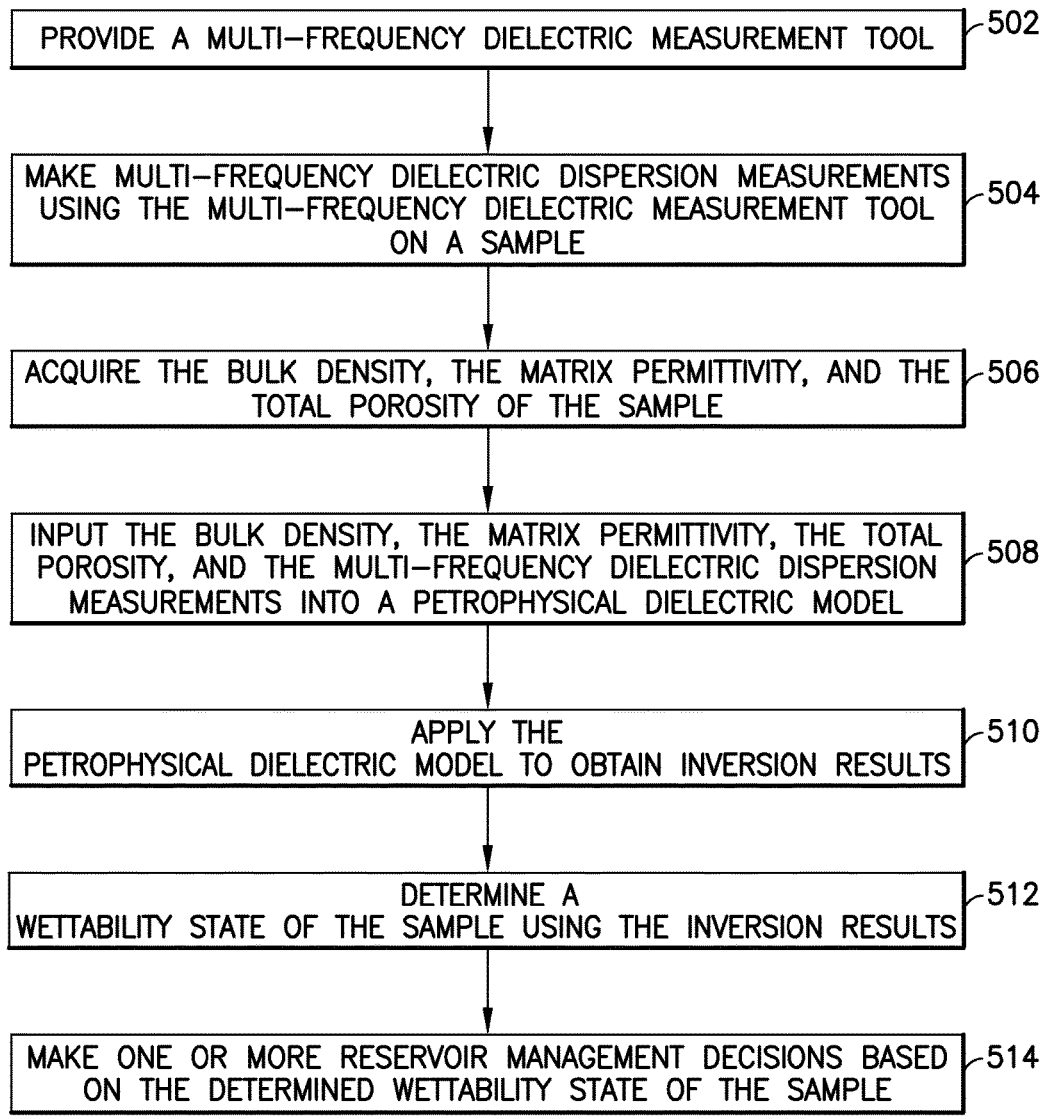
FIG. 5 is a workflow for determining an estimate of downhole wettability of a sample, in accordance with the present disclosure.

FIG. 5 shows a workflow of an embodiment to estimate the wettability of a formation using a dielectric measurement tool. A multi-frequency dielectric measurement tool is provided (502). Multi-frequency dielectric dispersion measurements are made using the multi-frequency dielectric measurement tool on a sample (504). A sample may include one or more core samples of a downhole formation or an in situ region of the downhole formation penetrated by a wellbore. The bulk density, matrix permittivity, and total porosity of the sample are acquired (506). The bulk density, the matrix permittivity, the total porosity, and the multi-frequency dielectric dispersion measurements are input into a petrophysical dielectric model (508) and the petrophysical dielectric model is applied to obtain inversion results (510). A wettability state of the sample is determined using the inversion results (512) and one or more reservoir management decisions are made based on the determined wettability state of the sample (514).

At least some of what is described above may be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the techniques described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. This memory may be used to store, for example, DRIFTS spectra, constituent standard spectra, and weighting scalars.

Some of what was described above can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of what was described above may be implemented using such logic devices.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions, and alterations herein without departing from the scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

While only certain embodiments have been set forth, alternatives and modifications will be apparent from the above description to those skilled in the art. These and other alternatives are considered equivalents and within the scope of this disclosure and the appended claims. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method, comprising:
providing a multi-frequency dielectric measurement tool;
accessing a sample of a downhole formation in a reservoir;
passing a signal originated from a transmitter of the multi-frequency dielectric measurement tool though the sample to make multi-frequency dielectric dispersion measurements of the sample;
acquiring a bulk density, a matrix permittivity, and a total porosity of the sample;
inputting the bulk density, the matrix permittivity, the total porosity, and the multi-frequency dielectric dispersion measurements into a petrophysical dielectric model;
applying the petrophysical dielectric model to obtain inversion results;
determining a wettability state of the sample using the inversion results; and
performing reservoir management of the reservoir based on the determined wettability state of the sample.

2. The method of claim 1, wherein the sample is selected from the group consisting of one or more core samples of a downhole formation and an in situ region of the downhole formation penetrated by a wellbore, wherein accessing the sample comprises at least one selected from a group consisting of extracting the one or more core samples from different formation depths and contacting the in situ region using an articulated pad where the transmitter is mounted.

3. The method of claim 1, wherein the making multi-frequency dielectric dispersion measurements is performed on the earth's surface or downhole in a wellbore.

4. The method of claim 1, wherein the determining the wettability state of the sample comprises estimating one or more parameters from the parameter group consisting of a free water volume, a bound water volume, and a bound water surface area of the sample.

5. The method of claim 4, wherein the determining the wettability state of the sample comprises estimating a bound water surface area of the sample, and further comprising linking the bound water surface area of the sample to the wettability state of the sample.

6. The method of claim 5, wherein the linking comprises associating a large bound water surface area with a water-wet sample and a small bound water surface area with an oil-wet sample.

7. The method of claim 1, wherein the sample comprises a plurality of samples taken at different formation depths.

8. The method of claim 7, further comprising determining the bound water surface area for each sample and estimating the wettability state for each formation depth corresponding to each particular sample.

9. The method of claim 1, further comprising obtaining nuclear magnetic resonance (NMR) measurements on the sample, determining a total bound fluid in the sample using the NMR measurements, computing a difference between the total bound fluid and the bound water, and determining a dominant bound fluid in the sample based on the computed difference.

10. The method of claim 9, wherein the sample is deemed oil-wet if the determined dominant bound fluid is oil or water-wet if the determined dominant bound fluid is water.

11. The method of claim 1, wherein the making multi-frequency dielectric dispersion measurements comprises using an electromagnetic signal in the frequency range of 10 MHz to 1 GHz, inclusive.

12. The method of claim 1, further comprising determining a parameter selected from the group of parameters consisting of formation water volume/saturation, water salinity, hydrocarbon residual saturation, rock texture, and rock geometry.

13. The method of claim 1, wherein the petrophysical dielectric model comprises a water dielectric model and a background model.

14. The method of claim 13, wherein the water dielectric model distinguishes between free water and bound water.

15. The method of claim 13, wherein the background model is selected from the group consisting of a Bimodal Model, a Stroud-Milton-De Model, a Shaly Sand Model, and a Complex Refractive Index Model.

16. The method of claim 13, wherein the petrophysical dielectric model accounts for thermodynamic conditions and boundedness effects when determining a complex permittivity of water.

17. The method of claim 1, wherein the inversion results are selected from the group consisting of a total water volume fraction, a free water volume fraction, a bound water volume fraction, a water volume fraction of water covering the grain surfaces, and a water-wet specific surface area.

18. A non-transitory, computer-readable storage medium, which has stored therein one or more programs, the one or more programs comprising instructions, which when executed by a processor, cause the processor to perform a method comprising:
accessing a sample of a downhole formation in a reservoir;
passing a signal originated from a transmitter of the multi-frequency dielectric measurement tool though the sample to make multi-frequency dielectric dispersion measurements of the sample;
acquiring a bulk density, a matrix permittivity, and a total porosity of the sample; inputting the bulk density, the matrix permittivity, the total porosity, and the multi-frequency dielectric dispersion measurements into a petrophysical dielectric model;
applying the petrophysical dielectric model to obtain inversion results;

determining a wettability state of the sample using the inversion results; and performing reservoir management of the reservoir based on the determined wettability state of the sample.

19. A system, comprising:
a multi-frequency dielectric measurement tool; and
a processor capable of:
accessing a sample of a downhole formation in a reservoir;
passing a signal originated from a transmitter of the multi-frequency dielectric measurement tool though the sample to make multi-frequency dielectric dispersion measurements of the sample;
acquiring a bulk density, a matrix permittivity, and a total porosity of the sample;
inputting the bulk density, the matrix permittivity, the total porosity, and the multi-frequency dielectric dispersion measurements into a petrophysical dielectric model;
applying the petrophysical dielectric model to obtain inversion results;

determining a wettability state of the sample using the inversion results; and performing reservoir management of the reservoir based on the determined wettability state of the sample.

20. The system of claim 19, wherein the multi-frequency dielectric measurement tool comprises an articulated pad contacting an in situ region of the downhole formation penetrated by a wellbore, a plurality of transmitters mounted on the articulated pad, a plurality of receivers mounted on the articulated pad, and a plurality of electric dipoles mounted on the articulated pad, wherein the sample comprises at least a portion of the in situ region.

* * * * *